United States Patent
Tsirkin (10) Patent No.: US 10,402,576 B2
(45) Date of Patent: Sep. 3, 2019

(54) SAFE PHYSICAL FUNCTION PASSTHROUGH USING VIRTUAL MACHINE FUNCTIONS

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 150 days.

(21) Appl. No.: 15/251,428

(22) Filed: Aug. 30, 2016

(65) Prior Publication Data

US 2018/0059974 A1   Mar. 1, 2018

(51) Int. Cl.
*G06F 9/455* (2018.01)
*G06F 21/62* (2013.01)
*G06F 21/53* (2013.01)

(52) U.S. Cl.
CPC .......... *G06F 21/6218* (2013.01); *G06F 21/53* (2013.01); *G06F 2009/45583* (2013.01); *G06F 2009/45587* (2013.01)

(58) Field of Classification Search
CPC .......... G06F 9/455; G06F 21/50; G06F 21/70; G06F 21/80
See application file for complete search history.

(56) References Cited

U.S. PATENT DOCUMENTS

| | | | |
|---|---|---|---|
| 8,533,713 B2 | 9/2013 | Dong | |
| 9,117,081 B2 | 8/2015 | Lukacs et al. | |
| 2008/0294808 A1* | 11/2008 | Mahalingam | G06F 13/105 710/26 |
| 2008/0294825 A1* | 11/2008 | Mahalingam | G06F 9/4812 710/262 |
| 2011/0179214 A1* | 7/2011 | Goggin | G06F 3/061 711/6 |
| 2011/0239213 A1* | 9/2011 | Aswani | G06F 9/45558 718/1 |
| 2013/0276057 A1 | 10/2013 | Smith et al. | |

(Continued)

OTHER PUBLICATIONS

LeVasseur et al., Unmodified Device Driver Reuse and Improved System Dependability via Virtual Machines, University of Karlsruhe, Germany, USENIX Association, OSDI 2004: 6th Symposium on Operating Systems Design and Implementaion, Link: https://www.usenix.org/legacy/event/osdi04/tech/full_papers/levasseur/levasseur.pdf (14 pages).

(Continued)

*Primary Examiner* — Edward J Dudek, Jr.
*Assistant Examiner* — Andrew Russell
(74) *Attorney, Agent, or Firm* — K&L Gates LLP (57) ABSTRACT

A system and method for safe physical function passthrough using virtual machine functions includes sending, by a guest on a virtual machine, an access request for a host device to a virtual machine function on the virtual machine. The method also includes determining, by the virtual machine function, whether the access request is valid responsive to receiving the access request. Responsive to determining that the access request is valid, the virtual machine function sends the access request to a virtual device on the virtual machine. The method further includes preventing, by a hypervisor executing on one or more processors, the guest from accessing the virtual device when not executing the virtual machine function.

20 Claims, 8 Drawing Sheets

(56) References Cited

U.S. PATENT DOCUMENTS

| | | | |
|---|---|---|---|
| 2014/0007230 A1* | 1/2014 | Jani | G06F 21/00 |
| | | | 726/22 |
| 2014/0189690 A1 | 7/2014 | Ramakrishnan Nair | |
| 2015/0220354 A1* | 8/2015 | Nair | G06F 13/28 |
| | | | 710/301 |
| 2015/0242227 A1* | 8/2015 | Nair | G06F 21/60 |
| | | | 718/1 |
| 2015/0288659 A1 | 10/2015 | Lukacs et al. | |

OTHER PUBLICATIONS

Tan et al., iKernel: Isolating Buggy and Malicious Device Drivers Using Hardware Virtualization Support, University of Illinois at Urbana-Champaign, Third IEEE International Symposium on Dependable, Autonomic and Secure Computing (DASC 2007), Link: http://choices.cs.illinois.edu/ikernel.pdf (9 pages).

Srivastava et al., Efficient Monitoring of Untrusted Kernel-Mode Execution, School of Computer Science, Georgia Institute of Technology, Feb. 7, 2011, Link: http://www.internetsociety.org/sites/default/files/sriv.pdf (18 pages).

Kleidermacher, David, Security Considerations in Embedded I/O Virtualization, RTC Magazine, Mar. 2011, Link: http://www.rtcmagazine.com/articles/view/102070 (5 pages).

Dontu et al., Zero-Footprint Guest Memory Introspection from Xen, Xen Project Developer Summit, Aug. 18, 2014, Link: http://www.slideshare.net/xen_com_mgr/zero-footprint-guest-memory-introspection-from-xen (37 pages).

* cited by examiner

FIG. 1

Default Host Page Table 182A

| 210A x0001 | 220A Read-Only | 230A x03FF000 |
|---|---|---|
| 210B x0002 | 220B Read-Write | 230B x040F000 |
| 210C x0003 | 220C Executable | 230C x041F000 |
| 210D x0004 | 220D Executable Only | 230D x042F000 |
| 210E x0005 | 230E Inaccessible | 230E x043F000 |

Alternate Host Page Table 182B

| 240A x0001 | 250A Read-Write | 260A x01AF000 |
|---|---|---|
| 240B x0002 | 250B Read-Write | 260B VM Function x01FF000 |
| 240C x0003 | 250C Read-Write | 260C VM Function x024F000 |
| 240D x0004 | 250D Read-Write | 260D VM Function x029F000 |
| 240E x0005 | 250E Read-Write | 260E VM Function x02EF000 |
| 240F x0006 | 250F Read-Write | 260F x033F000 |

Default Host Page Table 310
- 330A Read-Only
- 330B Read-Write
- 330C Executable
- 330D Executable Only
- 330E Inaccessible

Alternate Host Page Table 320
- 340A Read-Write
- 340B VM Function Read-Write
- 340C VM Function Read-Write
- 340D VM Function Read-Write
- 340E VM Function Read-Write
- 340F Read-Write

SAFE PHYSICAL FUNCTION PASSTHROUGH USING VIRTUAL MACHINE FUNCTIONS

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides new and innovative methods and systems for safe physical function passthrough using virtual machine functions. An example method includes receiving, by a virtual machine function on a virtual machine, from a guest on the virtual machine, an access request for a host device. The method also includes determining, by the virtual machine function, whether the access request is valid responsive to receiving the access request. Responsive to determining that the access request is valid, the virtual machine function sends the access request to a virtual device on the virtual machine. The method further includes preventing, by a hypervisor, the guest from accessing the virtual device, and allowing the guest's access to the virtual device through the virtual machine function when the virtual machine function is executing.

An example system includes a memory, one or more processors, in communication with the memory, a virtual machine, a guest executing on the virtual machine, and a hypervisor. The virtual machine and the hypervisor are configured to execute on the one or more processors. A virtual machine function on the virtual machine is configured to receive from the guest an access request for a host device. The virtual machine function is also configured to determine whether the request is valid responsive to receiving the request. The virtual machine function is further configured to send the request to a virtual device on the virtual machine responsive to determining that the request is valid. The hypervisor is configured to prevent the guest from accessing the virtual device and allow the guest's access to the virtual device through the virtual machine function when the virtual machine function is executing.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for safe physical function passthrough using virtual machine functions. Host device passthrough is a technique where guest requests (e.g., memory access requests) to a virtual device (also known as a passthrough device) are forwarded to a host device (also known as an assigned device) with little or no changes. A host device or assigned device may be a physical device that provides a desired function to one or more guests. Such guest requests may be translated by using a CPU Memory Management Unit (MMU), protecting unrelated devices from malicious guests. Similarly, host device requests (e.g., memory access requests or interrupts) may be forwarded to the guest with little or no changes. Such host device requests may be translated by using an Input/Output Memory Management Unit (IOMMU), protecting unrelated guests from malicious guest attacks through the device. However, the security of the above described host device passthrough depends on the assumption that the host device is implemented securely. In host device passthrough, the virtual device is always mapped into a guest memory location, so a malicious guest could bypass the IOMMU protections and corrupt the host device. For example, if a host device allows a malicious driver to override firmware in a memory of the host device, the malicious driver may bypass the IOMMU protections by replacing the firmware. Then, the malicious driver may have access to the host device memory and wait until the host device is moving to other virtual machines, which exposes the other virtual machines to risk of security attacks.

Aspects of the present disclosure may address the above noted deficiency by using virtual machine functions for safe physical function passthrough. In an example, a hypervisor may prevent a guest from accessing a virtual device unless the guest is using a virtual machine function. The hypervisor may also prevent the guest from accessing the virtual machine function unless the guest is executing a specific instruction (e.g., VMFUNC). In an example, a virtual machine function on a virtual machine may receive from a guest on the virtual machine an access request for a host device. Responsive to receiving the access request, the virtual machine function may determine whether the access request is valid. For example, the virtual machine function may determine that the request is invalid if the request is to override firmware in a host device memory. If the virtual machine function determines that the access request is valid, it may send the request to a virtual device. If the virtual machine function determines that the access request is invalid, the request is not sent to the virtual device. Accordingly, a malicious guest may be prevented from corrupting the host device.

In an example aspect, the hypervisor may detect a host interrupt. Then, the hypervisor may look up a correct guest and a correct virtual machine function that are assigned to the host device. The hypervisor may switch the correct guest to the correct virtual machine function and look up information about the host interrupt to translate the host interrupt to a tuple associated with the correct guest, the correct virtual machine function, and a virtual device interrupt. For example, the hypervisor may translate the host interrupt to a three-dimensional tuple of (guest, virtual machine function, virtual device interrupt). Then, the hypervisor may select the virtual device interrupt and send the selected virtual device interrupt to the correct virtual machine function. Then, the correct virtual machine function may send the selected virtual device interrupt to the correct guest. In this way, all inputs and outputs of the host device may need to go through a virtual machine function. Therefore, aspects of the present disclosure may be capable of preventing malicious guests from accessing and corrupting host devices, which may improve the system security when using passthrough with assigned physical function devices (i.e., host devices). Additional features and advantages of the disclosed method, system, and apparatus are described below.

Figure 1:
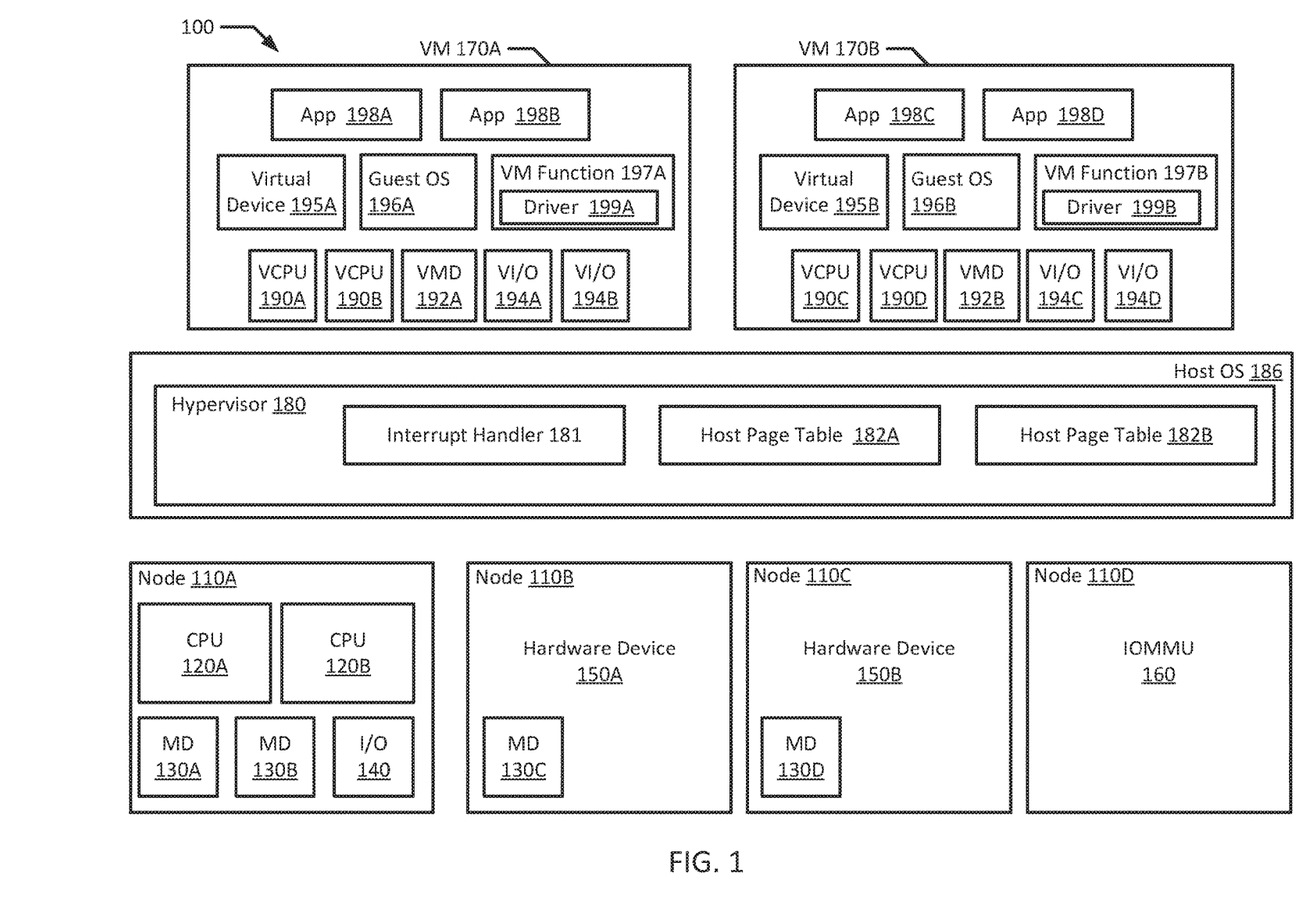
FIG. 1 is a block diagram of an example multiprocessor computer system according to an example of the present disclosure.

FIG. 1 depicts a high-level component diagram of an example multiprocessor computer system 100 for safe physical function passthrough using virtual machine functions according to an example of the present disclosure.

The computer system 100 may include one or more interconnected nodes 110A-D. The node 110A may include one or more physical processors (e.g., CPU 120A-B) communicatively coupled to memory devices (e.g., MD 130A-B) and one or more input/output devices (e.g., I/O 140). Each node 110B-C may include one or more memory devices (e.g., MD 130C-D). In an example, a hardware device (e.g., 150A-B) may include a network device (e.g., a network interface controller, a network adapter, or any other component that connects a computer to a computer network), a peripheral component interconnect (PCI) device, storage devices, sound or video adaptors, photo/video cameras, printer devices, keyboards, displays, etc. The node 110D may include an Input/Output Memory Management Unit (IOMMU) 160 configured to manage address translations. An IOMMU 160 is a hardware memory management unit (MMU) that resides on the input/output (I/O) path connecting the device to the memory. The IOMMU 160 may map the device address space (e.g., a bus address) that is relevant to the I/O bus into the physical address space (e.g., a host physical address) that is relevant to the memory bus. The IOMMU 160 may also include extra information associated with the address space mapping such as read and write permissions. In a non-virtualized system (i.e., a system without virtual machines), the bus address may be the same as the host physical address.

As used herein, physical processor or processor 120A-B refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140 refers to a device capable of providing an interface between one or more processor pins and an external device capable of inputting and/or outputting binary data.

Processors 120A-B may be interconnected using a variety of techniques, including a point-to-point processor interconnect, and a system area network, such as an Ethernet-based network. Local connections within each node 110A-D, including the connections between a processor 120A-B and a memory device 130A-B and between a processor 120A-B and an I/O device 140 may be provided by one or more local buses of suitable architecture, for example, peripheral component interconnect (PCI). As used herein, a device of the host OS 186 may refer to CPU 120A-B, MD 130A-B, I/O 140, a software device, and/or hardware device 150A-B.

As noted above, computer system 100 may run multiple virtual machines (e.g., VM 170A-B), by executing a software layer (e.g., hypervisor 180) above the hardware and below the virtual machines 170A-B, as schematically shown in FIG. 1. In an example, the hypervisor 180 may be a component of the host operating system 186 executed by the computer system 100. In another example, the hypervisor 180 may be provided by an application running on the operating system 186, or may run directly on the computer system 100 without an operating system beneath it. The hypervisor 180 may virtualize the physical layer, including processors, memory, I/O devices, hardware devices, and network interface controllers, and present this virtualization to virtual machines 170A-B as devices, including virtual processors (e.g., VCPU 190A-D), virtual memory devices (e.g., VMD 192A-B), virtual I/O devices (e.g., VI/O 194A-D), and/or virtual devices (e.g., 195A-B).

In an example, a virtual machine 170A-B may execute a guest operating system 196A-B which may utilize the underlying VCPU 190A-D, VMD 192A-B, and VI/O 194A-D devices. One or more applications 198A-D may be running on a virtual machine 170A-B under the guest operating system 196A-B. In an example, a device may be a device (e.g., VCPU 190A-D, VMD 192A-B, VI/O devices 194A-D, etc.) of a guest operating system 196A-B (that is, a "guest device").

A virtual machine 170A-B may run any type of dependent, independent, compatible, and/or incompatible applications on the underlying hardware and OS 186. In an example, applications (e.g., App 198A-D) executing on a virtual machine 170A-B may be dependent on the underlying hardware and/or OS 186. In another example, applications 198A-D executing on a virtual machine 170A-B may be independent of the underlying hardware and/or OS 186. For example, applications 198A-B executing on a first virtual machine 170A may be dependent on the underlying hardware and/or OS 186 while applications 198C-D executing on a second virtual machine 170B are independent of the underlying hardware and/or OS 186. Additionally, applications 198A-D executing on a virtual machine 170A-B may be compatible with the underlying hardware and/or OS 186. In an example, applications 198A-D executing on a virtual machine 170A-B may be incompatible with the underlying hardware and/or OS 186. For example, applications 198A-B executing on one virtual machine 170A may be compatible with the underlying hardware and/or OS 186 while applications 198C-D executing on another virtual machine 170B may be incompatible with the underlying hardware and/or OS 186. In an example, a device may be implemented as a virtual machine 170.

In an example, a virtual machine 170A-B may include multiple virtual processors (VCPU) 190A-D. Processor virtualization may be implemented by the hypervisor 180 scheduling time slots on one or more physical processors 120A-B such that from the guest operating system's perspective those time slots are scheduled on a virtual processor 190A-D.

In an example, the hypervisor 180 may provide one or more virtual machine functions (VM Functions) 197A-B to a virtual machine 170A-B. In an example, the VM Function 197A-B may be initialized by the hypervisor 180. In an example, the VM Function 197A may be invoked for a VM 170A, by the guest OS 196A that is running on the VM 170A. In an example, a VM Function 197A may only be invoked if hypervisor 180 provides access or grants a request. In an example, the VM Function 197A-B may be provided by the host CPU on which the hypervisor 180 is executing. In an example, a VM 170A or guest OS 196A may invoke a VM Function 197A to cause the hypervisor 180 to translate the guest addresses according to the protected host page table or the unprotected host page table. In an example, a hypervisor 180 may grant a VM 170A or guest OS 196A access to a VM Function 197A to allow the VM 170A or guest OS 196A to switch host page tables without an exit to the hypervisor 180. In an example, the hypervisor 180 may also deny the request by causing an undefined opcode exception or a general protection fault exception whenever the VM Function 197A-B is invoked. In an example, a VM Function 197A-B may include a driver 199A-B. In an example, the driver 199A-B is controlled by the hypervisor 180. For example, the driver 199A may be loaded by the hypervisor 180 from a hypervisor memory.

In an example, the hypervisor 180 may include an interrupt handler 181 that receives and manages an interrupt generated by a host device. The hypervisor 180 may also include one or more host page tables, such as a default host page table 182A and an alternative host page table 182B. In an example, the host page table may be an extended page table ("EPT"), translating guest physical addresses to host physical addresses. In another example, the host page table may be the shadow page table translating the guest virtual addresses to host physical addresses. In another example, the host page table may be the hypervisor page table, translating the guest physical addresses to hypervisor virtual addresses. Examples of these data structures are described in greater detail below and as shown in FIG. 2.

Figure 2:
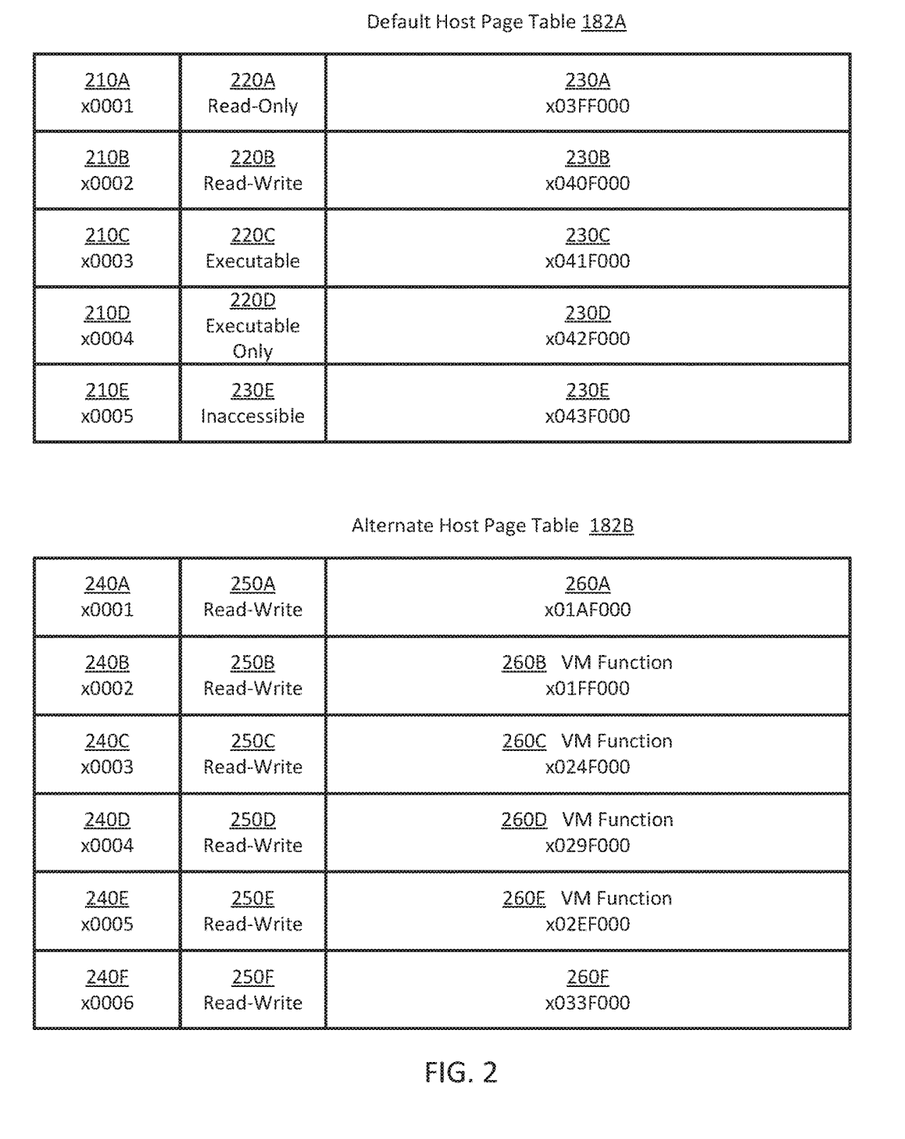
FIG. 2 is a block diagram of example default and alternate host page tables according to an example of the present disclosure.
Figure 3:
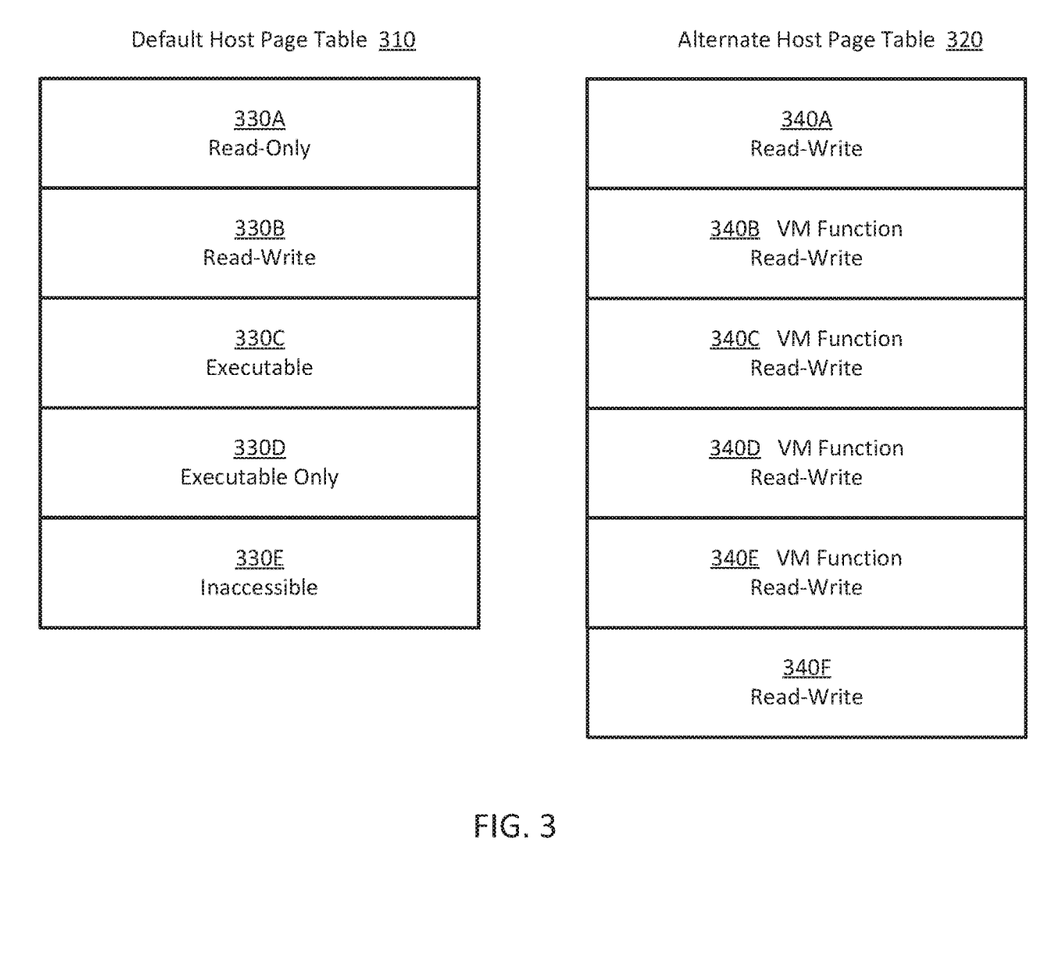
FIG. 3 is a block diagram of example default and alternate page views according to an example of the present disclosure.

FIG. 2 illustrates a default host page table (otherwise referred to as a page table) 182A and an alternative host page table 182B according to an example of the present disclosure. In general, the hypervisor 180 may manage the memory usage of the VMs 170A-B. Both virtual memory and physical memory may be divided into pages which are identified with a unique number (e.g., Page Frame Number (PFN) 210A-E or 240A-F). Examples of pages and page views are described in greater detail below and as shown in FIG. 3.

The host page tables 182A-B are data structures used by the hypervisor 180 to store a mapping of addresses of the guest OS 196A-B to addresses of the host OS 186 (e.g., physical resources of the computer system 100). Accordingly, address translation is handled using the host page tables 182A-B. For example, a guest OS 196A-B operating within the VMs 170A-B may be given the impression that there is a contiguous section of guest memory available, when in reality, the available guest memory may be spread across various memory devices 130A-B.

A host page table 182A-B includes entries that map PFN 210A-E (or 240A-F), for example an address of the guest OS 196A-B, with an address 230A-E (or 260A-F), for example an address of the host OS 186. Host page tables 182A-B may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL Extended Memory 64 Technology mode, etc.).

In an example, page tables 182A-B may also include an access status parameter 220A-E (or 250A-F). The access status parameter 220A-E (or 250A-F) indicates an access status for each of the pages (e.g., 330A-E and/or 340A-F). An access status may be used to define for example that a given page is writable (or read-write), write-protected (or read-only), executable (or executable and readable), executable only, inaccessible (or non-present), etc. For example, in FIG. 2, the page associated with virtual PFN x0001 and memory location x03FF000 has been defined in default page table 182A as 'Read-Only'. The page associated with virtual PFN x0001 and memory location x01AF000 in alternate page table 182B has been defined as 'Read-Write'. In addition, in an example, a host page table 182A-B may include additional information not shown in FIG. 2 including statistics information, background information, dirty identifiers which may indicate that modifications to a page must be written back to disk, etc.

In an example, one or more page tables 182A-B may be maintained by the hypervisor 180 which maps guest OS 196A-B addresses to host OS 186 addresses that are accessible by the hypervisor 180, VMs 170A-B, guest OS 196A-B, Host OS 186, Host OS resources, and/or VM Functions 197A-B. The sizes of different page tables may vary and may include more or fewer entries than are illustrated in FIG. 2.

FIG. 3 illustrates page views and pages, for example a default page view 310, an alternate page view 320, and pages 330A-E and 340A-F, in accordance with an example of the present disclosure. As noted above, a page may be a portion of physical or virtual memory designated for storing data. As used herein, a page view denotes a mapping from addresses designated for use by VM 170A-B to host OS 186 addresses. For example, a default page view 310 is a page view that is referenced by a default page table 182A. In an example, the default page view 310 may denote the mapping from virtual PFNs of a VM 170A-B to host-physical addresses, as used during normal execution of the virtual machine. An alternate page view 320 is a page view that is referenced by an alternate page table 182B, as used during execution of the VM Function 197A-B. In an example, the alternate page view 320 may denote a mapping from addresses designated for use by the VM Function 197A-B to host OS 186 addresses. In the illustrated example in FIG. 3, only a portion of pages on alternate page view 320 are designated for use by the VM Function 197A-B (e.g., 340B-E) and the remaining pages (e.g., 340A and 340F)

refer to locations in the alternate page view 320 that are outside the memory location of the VM Function 197A-B. In an example, memory that is designated for use by the VM Function 197A-B refers to memory at which the VM Function 197A-B is stored. In another example, memory that is designated for use by the VM Function 197A-B refers to memory that is generally allocated or accessible to the VM Function 197A-B.

As illustrated in FIG. 3, pages (e.g., 330A and 340A) may be defined by access status parameters (described above in more detail) such as 'read-only' or 'readable-writable' in accordance with their respective page table access status parameters (e.g., 220A and 250A). A VM Function 197A-B may change the mapping of guest-physical addresses to host-physical addresses, e.g., page views 310 or 320, by changing the page tables 182A-B that the processor 120A-B uses to perform memory accesses in the VM 170A-B.

Figure 4:
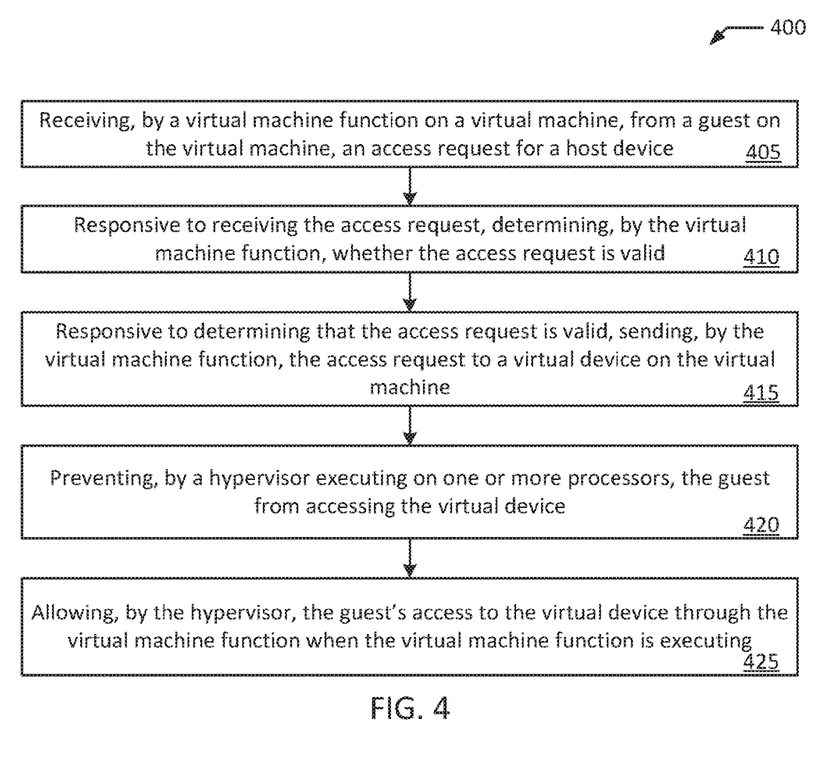
FIG. 4 is a flowchart illustrating an example method for safe physical function passthrough using virtual machine functions according to an example of the present disclosure.

FIG. 4 shows a flowchart of an example method 400 for safe physical function passthrough using virtual machine functions. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, a virtual machine function on a virtual machine may receive from a guest on the virtual machine an access request for a host device (block 405). For example, a VM Function 197A (or a driver 199A in the VM Function 197A) may receive from the guest operating system 196A or Application 198A running on the guest operating system 196Aa write/read access request for a host device 150A. As used herein, a guest may refer to any software running within the virtual machines (e.g., VM 170A-B), such as guest operating systems (e.g., guest OS 196A-B) or applications running on the guest operating systems (e.g., Applications 198A-D). In an example, the access request is sent to the VM Function 197A or the driver 199A using a guest independent interface, such as the VMCI interface. Then, in response to receiving the access request, the virtual machine function may determine whether the access request is valid (block 410). For example, the VM Function 197A may determine whether the write/read access request is valid after receiving the request.

Then, responsive to determining that the access request is valid, the virtual machine function may send the access request to a virtual device on the virtual machine (block 415). For example, once it is determined that the write/read access request is valid, the VM Function 197A may send the request to a virtual device 195A. In an example, the virtual machine function may determine that the request is invalid if the request is to override firmware in a host device memory. In an example, a hypervisor may prevent the guest from accessing the virtual device (block 420). For example, the hypervisor 180 may prevent the guest OS 196A or the Application 198A from accessing the virtual device 195A when not executing the virtual machine function. The hypervisor may allow the guest's access to the virtual device through the virtual machine function when the virtual machine function is executing (block 425). For example, the hypervisor 180 may allow the guest OS 196A or Application 198A's access to the virtual device 195A through the VM Function 197A when the VM Function 197A is executing.

Figure 5:
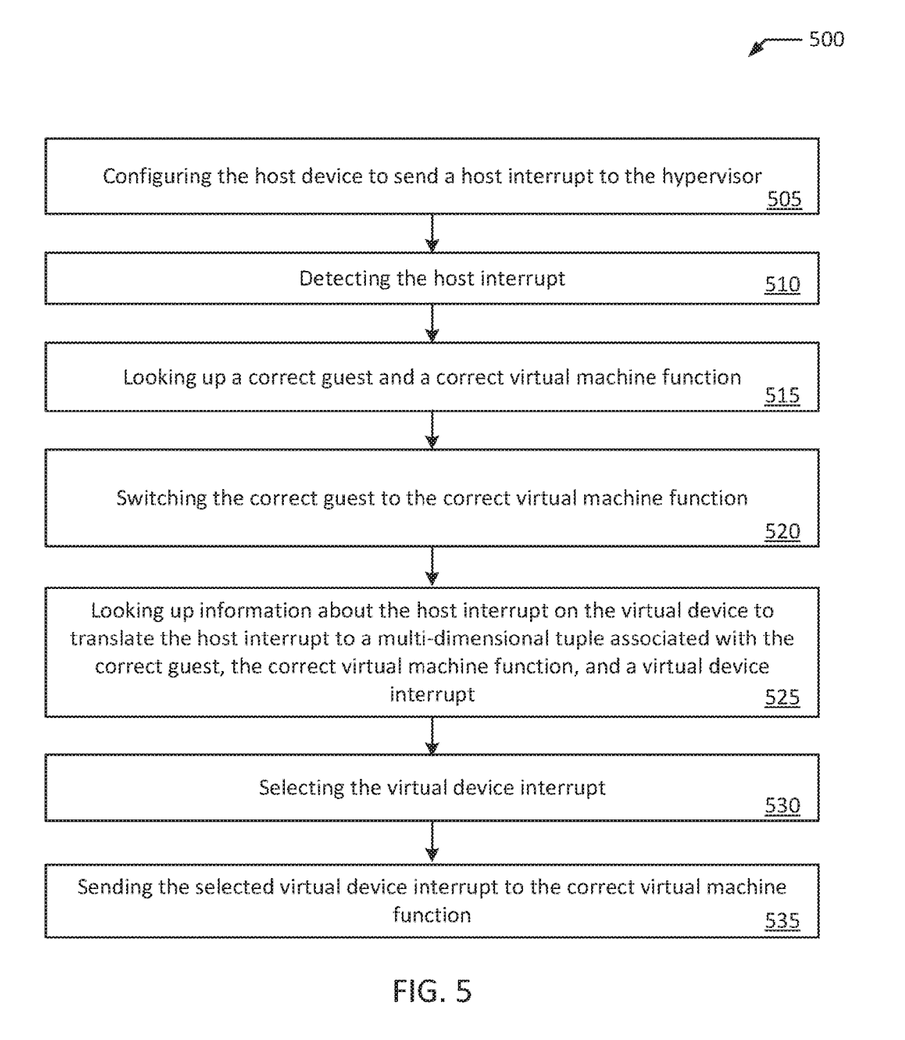
FIG. 5 is a flowchart illustrating an example method for safe physical function passthrough using virtual machine functions according to an example of the present disclosure.

FIG. 5 shows a flowchart of an example method 500 for safe physical function passthrough using virtual machine functions. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional.

In the illustrated example, a hypervisor may configure a host device to send a notification or a host interrupt to the hypervisor (block 505). For example, the hypervisor 180 may configure a host device 150A to send a host interrupt to the hypervisor 180. Then, the hypervisor may detect the host interrupt (block 510) and look up a correct guest and a correct virtual machine function (block 515). For example, the hypervisor 180 may detect a host interrupt and look up a correct guest (e.g., guest OS 196A or Application 198A) and a correct VM Function 197A. Then, the hypervisor may switch the correct guest to the correct virtual machine function (block 520). For example, the hypervisor 180 may switch the correct guest (e.g., guest OS 196A or Application 198A) to the correct VM Function 197A by switching a host page table for the correct guest (e.g., Default Host Page Table 182A) to a host page table for the correct VM Function 197A (e.g., Alternative Host Page Table 182B).

Then, the hypervisor may look up information about the host interrupt on the virtual device to translate the host interrupt to a multi-dimensional tuple associated with the correct guest, the correct virtual machine function, and a virtual device interrupt (block 525). For example, the hypervisor 180 may look up information about the host interrupt on the virtual device 195A to translate the host interrupt to a three-dimensional tuple of (guest, VM Function, virtual device interrupt). In this case, the tuple may be associated with the correct guest (e.g., guest OS 196A or Application 198A), the correct VM Function 197A, and a virtual device interrupt in the virtual device 195A. In an example, the tuple may not be limited to three-dimension, and the tuple can have more dimensions (e.g., four dimensions, five dimensions, etc.) including more information about the virtual machine or the host interrupt. Then, the hypervisor may select the virtual device interrupt (block 530) and send the selected virtual device interrupt to the correct virtual machine function (block 535). For example, the hypervisor 180 may select the virtual device interrupt in the virtual device 195A and send the selected virtual device interrupt to the correct VM Function 197A.

Figure 6A:
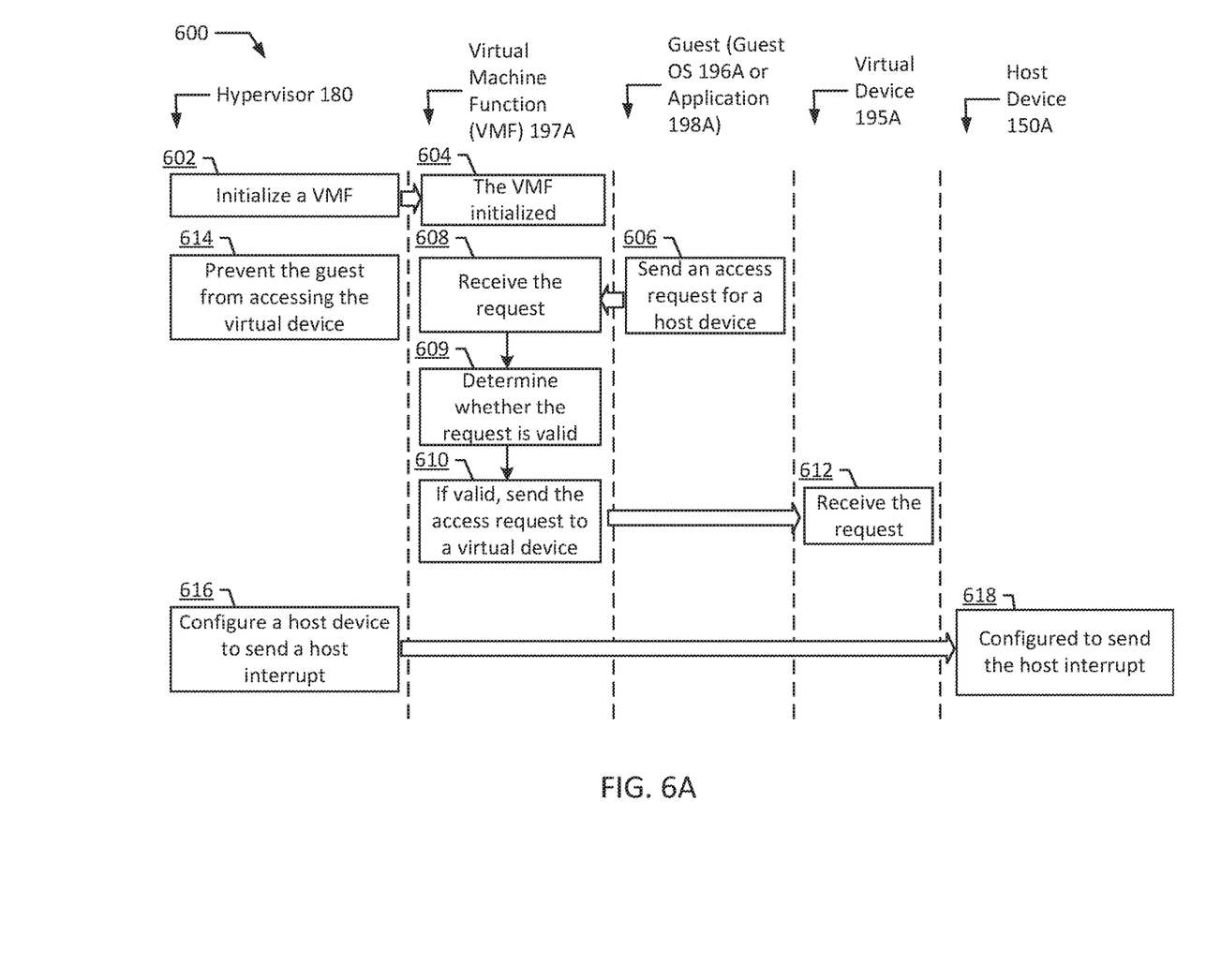
FIGS. 6A and 6B are flow diagrams illustrating an example process for safe physical function passthrough using virtual machine functions according to an example of the present disclosure.
Figure 6B:
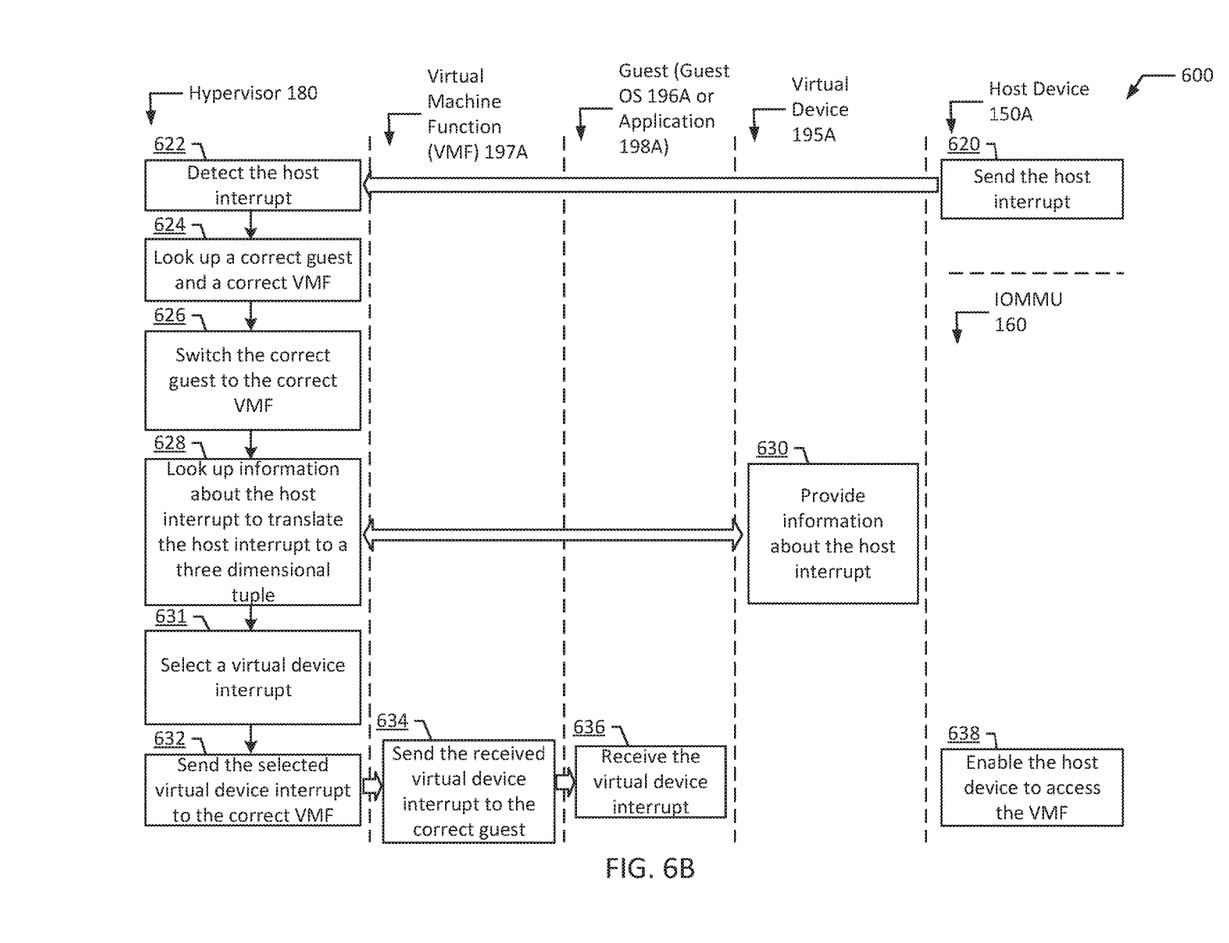

FIGS. 6A and 6B illustrate flow diagrams of an example method 600 for safe physical function passthrough using virtual machine functions according to an example of the present disclosure. Although the example method 600 is described with reference to the flow diagram illustrated in FIG. 6, it will be appreciated that many other methods of performing the acts associated with the method may be used. For example, the order of some of the blocks may be changed, certain blocks may be combined with other blocks, and some of the blocks described are optional. The method 600 may be performed by processing logic that may include hardware (circuitry, dedicated logic, etc.), software, or a combination of both.

In the illustrated example, the hypervisor 180 may initialize a VM Function 197A (blocks 602 & 604). The guest (e.g., guest OS 196A or Application 198A running on the guest OS 196A) may send an access request for a host device 150A (block 606). Then, the VM Function 197A may receive the request and determine whether the request is valid (blocks 608 & 609). If the request is valid, the VM Function 197A may send the access request to a virtual device 195A and the virtual device 195A may receive the request (blocks 610 & 612). In an example, the VM Function 197A may determine that the request is invalid if the request is to override firmware in a host device memory. If it is determined that the request is invalid, the VM Function 197A may deny the access request. In an example, the hypervisor 180 may prevent the guest from accessing the virtual device 195A when not executing the VM Function 197A (block 614). For example, the hypervisor 180 may prevent the guest (guest OS 196A or Application 198A) from accessing the VM Function 197A unless the guest is executing a specific instruction (e.g., VMFUNC).

In an example, the hypervisor 180 may configure a host device 150A to send a host interrupt (blocks 616 & 618). In an example, the host device 150A may send the host interrupt and the hypervisor 180 may detect the host interrupt (blocks 620 & 622). Then, the hypervisor may look up a correct guest and a correct virtual machine function among a plurality of guests and a plurality of virtual machine functions (block 624). In an example, the hypervisor may determine that the guest OS 196A (or Application 198A) and the VM Function 197A are correct for the host interrupt generated from the host device 150A because the guest OS 196A (or Application 198A) and the VM Function 197A are assigned to the host device 150A. Then, the hypervisor 180 may switch the correct guest to the correct VM Function 197A (block 626). For example, the guest (e.g., guest OS 196A or Application 198A) is switched to the VM Function 197A by switching a host page table for the guest (e.g., Default Host Page Table 182A) to a host page table for the VM Function 197A (e.g., Alternative Host Page Table 182B). In an example, the hypervisor 180 may configure the host page table for the guest (e.g., guest OS 196A or Application 198A) to prevent the guest from accessing the virtual device 195A. In an example, the hypervisor 180 may configure the host page table for the VM Function 197A to allow the VM Function 197A's access to the virtual device. In an example, the hypervisor 180 may configure the host page table for the VM Function 197A to translate an access to the virtual device 195A to the host device 150A.

Then, the hypervisor 180 may look up information about the host interrupt on the virtual device 195A to translate the host interrupt to a three-dimensional tuple of (guest, VM Function, virtual device interrupt) (block 628) and provide the information to the virtual device 195A (block 630). In this case, the tuple may be associated with the correct guest OS 196A (or Application 198A), the correct VM Function 197A, and a virtual device interrupt in the virtual device 195A. Then, the hypervisor 180 may select the virtual device interrupt in the virtual device 195A (block 631) and send the selected virtual device interrupt to the correct VM Function 197A (block 632). Then, the VM Function 197A may send the received virtual device interrupt to the correct guest (e.g., guest OS 196A or Application 198A) (blocks 634 & 636). In an example, an IOMMU 160 may enable the host device 150A to access the VM Function 197A (block 638). For example, the IOMMU 160 may allow the host device 150A's access to the VM Function 197A by translating hos addresses to VM Function addresses.

Figure 7:
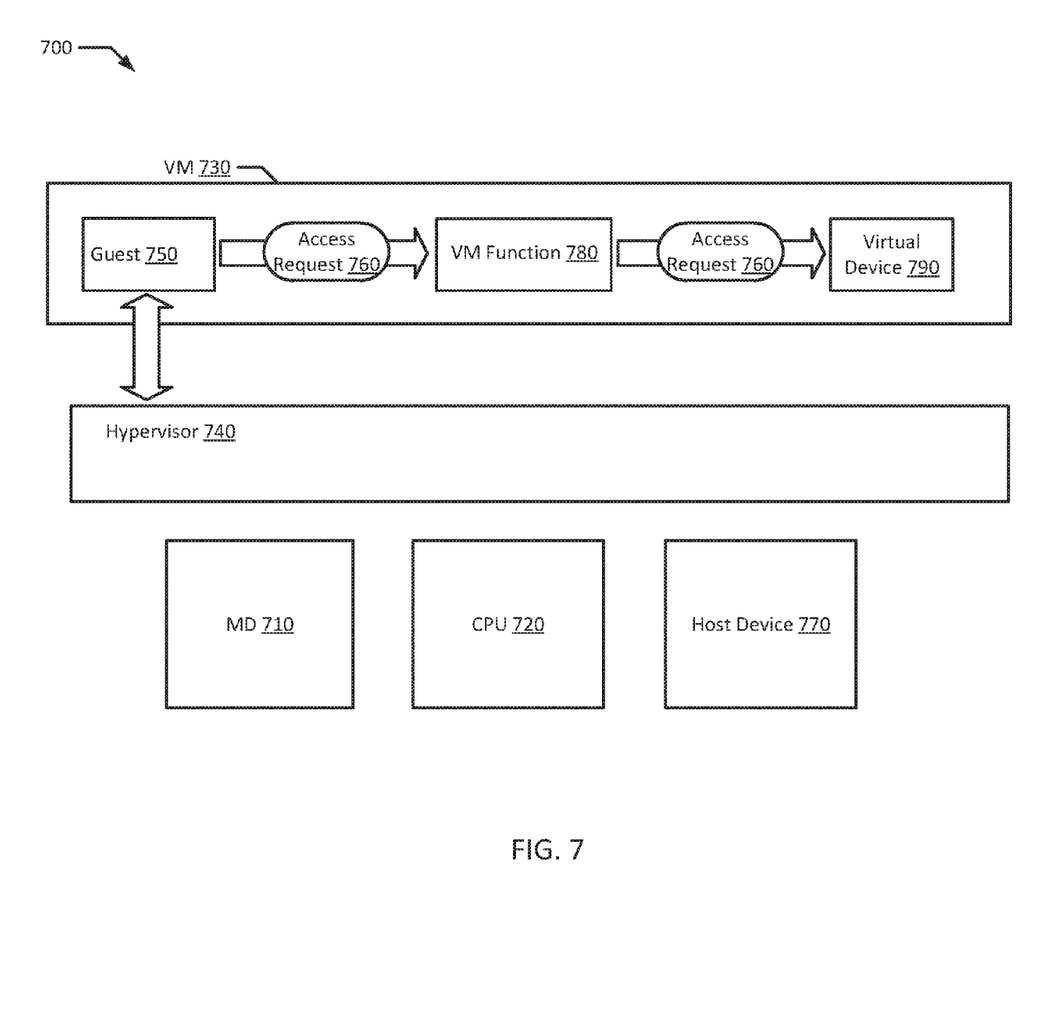
FIG. 7 is a block diagram of an example system according to an example of the present disclosure.

FIG. 7 shows a block diagram of an example safe physical function passthrough system according to an example of the present disclosure. As illustrated in FIG. 7, an example system 700 may include a memory 710, a processor 720, in communication with the memory 710, a virtual machine 730 executing on the processor 720, a guest 750 on the virtual machine 730, and a hypervisor 740 executing on the processor 720. A virtual machine function 780 on the virtual machine 730 may be configured to receive, from the guest 750, an access request 760 for a host device. Responsive to receiving the access request 760, the virtual machine function 780 may determine whether the access request 760 is valid. Responsive to determining that the access request 760 is valid, the virtual machine function 780 may send the access request 760 to a virtual device 790 on the virtual machine 730. The hypervisor 740 may be configured to prevent the guest 750 from accessing the virtual device 790. The hypervisor 740 may be configured to allow the guest 750's access to the virtual device 790 through the virtual machine function 780 when the virtual machine function 780 is executing.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for safe physical function passthrough, the method comprising:
  receiving, by a virtual machine function on a virtual machine, from a guest on the virtual machine, an access request for a host device, wherein the virtual machine function includes a driver;
  responsive to receiving the access request, determining, by the virtual machine function, whether the access request is valid;

responsive to determining that the access request is valid, sending, by the virtual machine function, the access request to a virtual device on the virtual machine;

preventing, by a hypervisor executing on one or more processors, the guest from accessing the virtual device by using a host page table for the guest, wherein the host page table for the guest is configured to prevent the guest's direct access to the virtual device; and allowing, by the hypervisor, the guest's access to the virtual device through the virtual machine function when the virtual machine function is executing by using a host page table for the virtual machine function, wherein the host page table for the virtual machine function is configured to allow the virtual machine function's access to the virtual device, wherein the hypervisor allows the guest's access to the virtual device through the virtual machine function by allowing the guest to switch the host page table for the guest to the host page table for the virtual machine function.

2. The method of claim 1, further comprising:
configuring, by the hypervisor, the host device to send at least one host interrupt to the hypervisor;
detecting, by the hypervisor, the at least one host interrupt;
looking up, by the hypervisor, a correct guest and a correct virtual machine function, wherein there are a plurality of guests and a plurality of virtual machine functions, wherein both the correct guest and the correct virtual machine function are assigned to the host device; and
switching, by the hypervisor, the correct guest to the correct virtual machine function.

3. The method of claim 2, further comprising:
looking up, by the hypervisor, information about the at least one host interrupt on the virtual device to translate the at least one host interrupt to a multi-dimensional tuple associated with the correct guest, the correct virtual machine function, and at least one virtual device interrupt;
selecting, by the hypervisor, the at least one virtual device interrupt; and
sending, by the hypervisor, the selected virtual device interrupt to the correct virtual machine function.

4. The method of claim 3, further comprising sending, by the correct virtual machine function, the selected virtual device interrupt to the correct guest.

5. The method of claim 2, further comprising:
preventing, by the hypervisor, the correct guest from accessing the virtual device; and
allowing, by the hypervisor, the correct virtual machine function's access to the virtual device.

6. The method of claim 2, further comprising translating, by the hypervisor, an access to the virtual device to the host device.

7. The method of claim 2, further comprising enabling, by an input-output memory management unit, the host device to access the correct virtual machine function.

8. The method of claim 1, wherein the virtual machine function determines that the request is invalid if the request is to override firmware in a host device memory.

9. The method of claim 1, wherein the access request is sent to the driver on the virtual machine function using a guest independent interface.

10. The method of claim 1, further comprising preventing, by the hypervisor, the guest from accessing the virtual machine function unless the guest is executing a specific instruction.

11. The method of claim 1, wherein only the virtual machine function has access to the virtual device.

12. The method of claim 1, further comprising initializing, by the hypervisor, the virtual machine function.

13. A system for safe physical function passthrough, the system comprising:
a memory;
one or more processors, in communication with the memory;
a virtual machine executing on the one or more processors; and
a hypervisor executing on the one or more processors,
wherein the one or more processors:
receives, by a virtual machine function on the virtual machine, from a guest on the virtual machine, an access request for a host device, wherein the virtual machine function includes a driver;
responsive to receiving the request, determines, by the virtual machine function, whether the request is valid;
responsive to determining that the request is valid, sends, by the virtual machine function, the request to a virtual device on the virtual machine;
prevents, by the hypervisor, the guest from accessing the virtual device by using a host page table for the guest, wherein the host page table for the guest is configured to prevent the guest's direct access to the virtual device; and
allows, by the hypervisor, the guest's access to the virtual device through the virtual machine function when the virtual machine function is executing by using a host page table for the virtual machine function, wherein the host page table for the virtual machine function is configured to allow the virtual machine function's access to the virtual device,
wherein the hypervisor allows the guest's access to the virtual device through the virtual machine function by allowing the guest to switch the host page table for the guest to the host page table for the virtual machine function.

14. The system of claim 13, wherein the hypervisor:
configures the host device to send at least one host interrupt to the hypervisor;
detects the at least one host interrupt;
looks up a correct guest and a correct virtual machine function, wherein there are a plurality of guests and a plurality of virtual machine functions, wherein both the correct guest and the correct virtual machine function are assigned to the host device; and
switches the correct guest to the correct virtual machine function.

15. The system of claim 14, wherein the hypervisor:
looks up information about the at least one host interrupt on the virtual device to translate the at least one host interrupt to a multi-dimensional tuple associated with the correct guest, the correct virtual machine function, and at least one virtual device interrupt;
selects the at least one virtual device interrupt; and
sends the selected virtual device interrupt to the correct virtual machine function.

16. The system of claim 15, wherein the correct virtual machine function sends the selected virtual device interrupt to the correct guest.

17. The system of claim 14, wherein the hypervisor:
prevents the correct guest from accessing the virtual device; and allows the correct virtual machine function's access to the virtual device.

18. The system of claim 13, wherein the hypervisor translates an access to the virtual device to the host device.

19. The system of claim 13, wherein the virtual machine function determines that the request is invalid if the request is to override firmware in a host device memory.

20. A non-transitory machine readable medium storing instructions, which when executed by a processor, cause the processor to:
receive, by a virtual machine function on a virtual machine, from a guest on the virtual machine, an access request for a host device, wherein the virtual machine function includes a driver;
responsive to receiving the request, determine, by the virtual machine function, whether the request is valid;
responsive to determining that the request is valid, send, by the virtual machine function, the request to a virtual device on the virtual machine;
prevent, by the hypervisor, the guest from accessing the virtual device by using a host page table for the virtual machine function, wherein the host page table for the virtual machine function is configured to allow the virtual machine function's access to the virtual device; and
allow, by the hypervisor, the guest's access to the virtual device through the virtual machine function when the virtual machine function is executing by using a host page table for the virtual machine function, wherein the host page table for the virtual machine function is configured to allow the virtual machine function's access to the virtual device,
wherein the hypervisor allows the guest's access to the virtual device through the virtual machine function by allowing the guest to switch the host page table for the guest to the host page table for the virtual machine function.

* * * * *